(12) United States Patent
Mishima

(10) Patent No.: US 8,199,170 B2
(45) Date of Patent: Jun. 12, 2012

(54) DISPLAY CONTROL DEVICE, MEDIA MANAGEMENT DEVICE, AND COMPUTER-READABLE MEDIUM

(75) Inventor: Yu Mishima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1054 days.

(21) Appl. No.: 11/984,181

(22) Filed: Nov. 14, 2007

(65) Prior Publication Data

US 2008/0238948 A1    Oct. 2, 2008

(30) Foreign Application Priority Data

Mar. 29, 2007    (JP) ................................. 2007-086630

(51) Int. Cl.
     *G09G 5/00*    (2006.01)
(52) U.S. Cl. ........ 345/672; 345/619; 345/629; 715/788; 715/790; 715/792
(58) Field of Classification Search .................. 345/629, 345/619, 672; 715/790, 792, 793, 788; 353/30
See application file for complete search history.

(56) References Cited

U.S. PATENT DOCUMENTS

| | | | |
|---|---|---|---|
| 5,805,243 A * | 9/1998 | Hatano et al. ................... | 353/84 |
| 5,826,962 A | 10/1998 | Rodriguez | |
| 5,853,327 A | 12/1998 | Gilboa | |
| 6,986,583 B2 * | 1/2006 | Nishio et al. ................... | 353/30 |
| 7,134,756 B2 | 11/2006 | Drucker et al. | |
| 7,432,876 B2 | 10/2008 | Okuley | |
| 7,446,731 B2 | 11/2008 | Yoon | |
| 7,453,418 B2 | 11/2008 | Palmquist | |
| 7,474,983 B2 | 1/2009 | Mazalek et al. | |
| 7,641,348 B2 | 1/2010 | Yin et al. | |
| 2001/0044858 A1 | 11/2001 | Rekimoto | |
| 2005/0188306 A1 * | 8/2005 | Mackenzie ................... | 715/793 |
| 2006/0149495 A1 * | 7/2006 | Mazalek et al. .............. | 702/150 |
| 2007/0046983 A1 * | 3/2007 | Hull et al. .................... | 358/1.15 |
| 2008/0238948 A1 * | 10/2008 | Mishima ....................... | 345/672 |
| 2009/0063542 A1 * | 3/2009 | Bull et al. .................... | 715/790 |

FOREIGN PATENT DOCUMENTS

| | | |
|---|---|---|
| JP | A-09-319556 | 12/1997 |
| JP | A-2001-136504 | 5/2001 |
| JP | A-2001-175374 | 6/2001 |
| JP | A-2006-072071 | 3/2006 |

(Continued)

OTHER PUBLICATIONS

Wellner, Pierre, "Interacting with paper on the digitaldesk", Communications of the ACM, Jul. 1993, vol. , No. 7, p. 87-96.*

(Continued)

*Primary Examiner* — Chante Harrison
(74) *Attorney, Agent, or Firm* — Oliff & Berridge, PLC

(57) ABSTRACT

A display control device includes a state specifying unit, an information specifying unit and a controller. The state specifying unit specifies a placement state of a medium on a display screen. The information specifying unit specifies either (i) electronic information which is a source of an image recorded on the medium or (ii) electronic information relevant to the electronic information which is the source of the image recorded on the medium. The controller controls such that a specific image representing the electronic information specified by the information specifying unit is displayed on the display screen in accordance with the placement state specified by the state specifying unit.

12 Claims, 15 Drawing Sheets

FOREIGN PATENT DOCUMENTS

JP  A-2006-202016  8/2006

OTHER PUBLICATIONS

Holman, David et al., "PaperWindows: Interaction Techniques for Digital Paper", CHI 2005, Papers: Physical Interaction, Apr. 2-7, 2005, p. 591-599.*

U.S. Appl. No. 11/984,185, filed Nov. 14, 2007 in the name of Kimitake Hasuike.

Dec. 22, 2010 Office Action issued in U.S. Appl. No. 11/984,185.
Feb. 17, 2011 Office Action issued in U.S. Appl. No. 11/984,185.
Nov. 30, 2011 Office Action issued in U.S. Appl. No. 11/984,185.
Dec. 6, 2011 Japanese Office Action issued in Japanese Patent Application No. 2007-086630 (with translation).

Arai "Desk Type Dialog Environment Reacting an Operation in the Real World," Computer Software, Japan Software Science Study, May 15, 1996, vol. 13, No. 3, pp. 19-27.

* cited by examiner

FIG. 2A

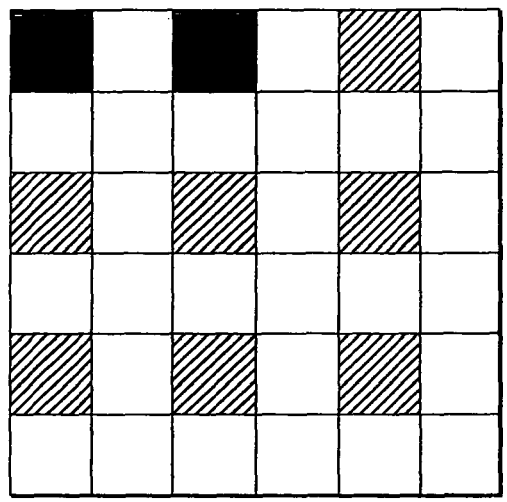

FIG. 2B

| SYNCHRO-NOUS CODE 2 BITS | IDENTIFI-CATION CODE 5 BITS | IDENTIFI-CATION CODE 5 BITS | IDENTIFI-CATION CODE 5 BITS | IDENTIFI-CATION CODE 5 BITS |
|---|---|---|---|---|
| IDENTIFI-CATION CODE 5 BITS | IDENTIFI-CATION CODE 5 BITS | IDENTIFI-CATION CODE 5 BITS | IDENTIFI-CATION CODE 5 BITS | IDENTIFI-CATION CODE 5 BITS |
| IDENTIFI-CATION CODE 5 BITS | IDENTIFI-CATION CODE 5 BITS | IDENTIFI-CATION CODE 5 BITS | IDENTIFI-CATION CODE 5 BITS | IDENTIFI-CATION CODE 5 BITS |
| IDENTIFI-CATION CODE 5 BITS | IDENTIFI-CATION CODE 5 BITS | IDENTIFI-CATION CODE 5 BITS | IDENTIFI-CATION CODE 5 BITS | IDENTIFI-CATION CODE 5 BITS |
| IDENTIFI-CATION CODE 5 BITS | IDENTIFI-CATION CODE 5 BITS | IDENTIFI-CATION CODE 5 BITS | IDENTIFI-CATION CODE 5 BITS | IDENTIFI-CATION CODE 5 BITS |

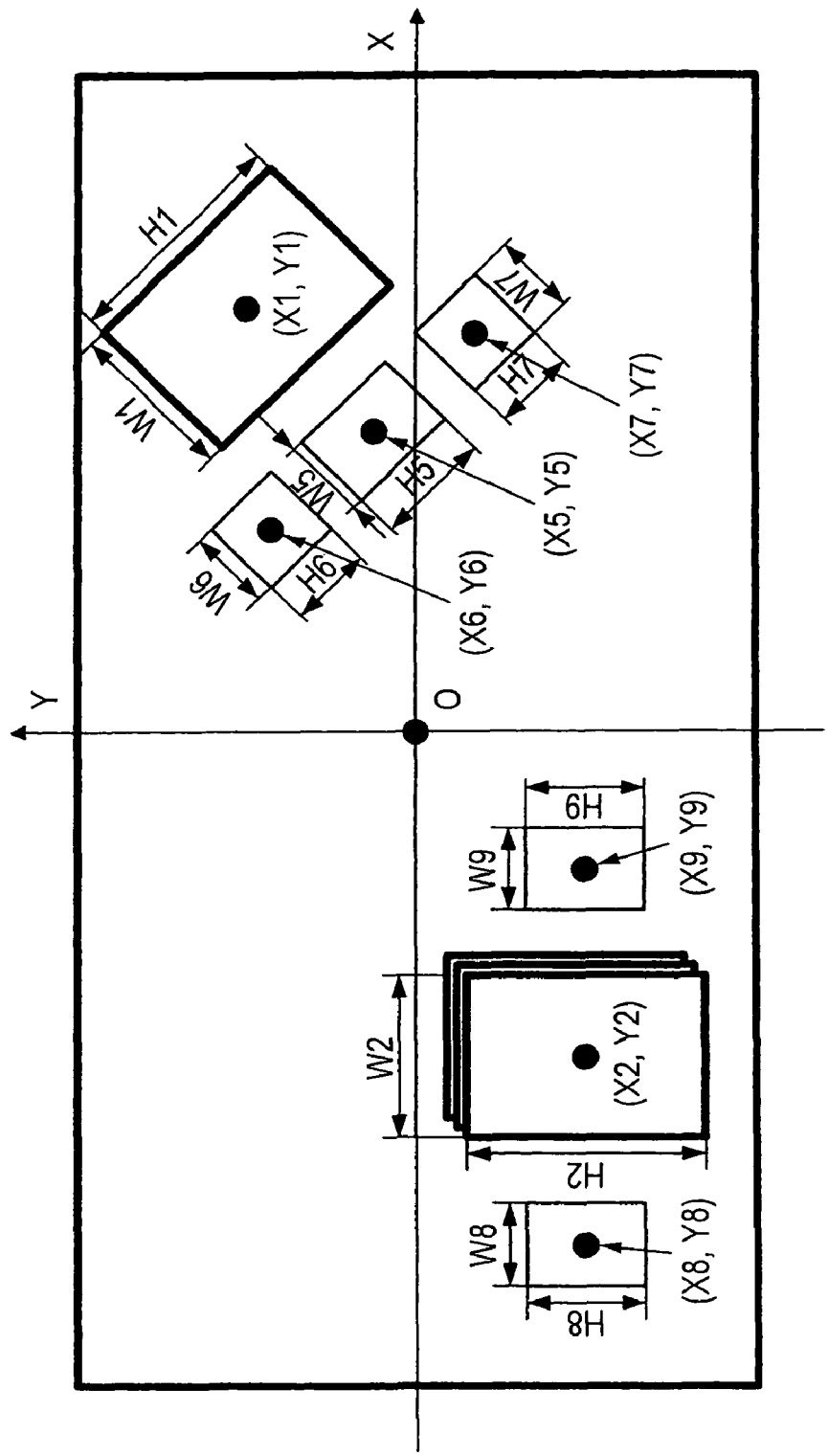

FIG. 10A

| APPARATUS ID | PAPER ID | PLACEMENT STATE | BUNDLE ID |
|---|---|---|---|
| A001 | P001 | X1, Y1, W1, H1, G1, L1 | |
| A001 | P002 | X2, Y2, W2, H2, G2, L2 | B001 |
| A001 | P003 | X3, Y3, W3, H3, G3, L3 | B001 |
| A001 | P004 | X4, Y4, W4, H4, G4, L4 | B001 |
| ⋮ | ⋮ | ⋮ | ⋮ |

FIG. 10B

| APPARATUS ID | DOCUMENT ID | PAGE | DISPLAY STATE |
|---|---|---|---|
| A001 | D001 | 4 | X5, Y5, W5, H5, G5, L5 |
| A001 | D011 | 1 | X6, Y6, W6, H6, G6, L6 |
| A001 | D012 | 1 | X7, Y7, W7, H7, G7, L7 |
| A001 | D002 | 3 | X8, Y8, W8, H8, G8, L8 |
| A001 | D002 | 5 | X9, Y9, W9, H9, G9, L9 |
| ⋮ | ⋮ | ⋮ | ⋮ |

FIG. 11A

| PAPER ID | DOCUMENT ID | PAGE |
|---|---|---|
| P001 | D001 | 4 |
| P002 | D002 | 4 |
| P003 | D003 | 2 |
| P004 | D004 | 6 |
| ⋮ | ⋮ | ⋮ |

FIG. 11B

| DOCUMENT ID | PAGE | DISPLAY STATE | DOCUMENT ID | PAGE | DISPLAY STATE |
|---|---|---|---|---|---|
| D001 | 4 | X5, Y5, W5, H5, G5, L5 | D011 | 1 | X6, Y6, W6, H6, G6, L6 |
| D001 | 4 | X5, Y5, W5, H5, G5, L5 | D012 | 1 | X7, Y7, W7, H7, G7, L7 |
| ⋮ | ⋮ | ⋮ | ⋮ | ⋮ | ⋮ |

DISPLAY CONTROL DEVICE, MEDIA MANAGEMENT DEVICE, AND COMPUTER-READABLE MEDIUM

CROSS-REFERENCE TO RELATED APPLICATIONS

This application is based on and claims priority under 35 U.S.C. §119 from Japanese Patent Application No. 2007-86630 filed Mar. 29, 2007.

BACKGROUND

Technical Field

The invention relates to a display control device, a media management device, and a computer-readable medium.

SUMMARY

According to an aspect of the invention, a display control device includes a state specifying unit, an information specifying unit and a controller. The state specifying unit specifies a placement state of a medium on a display screen. The information specifying unit specifies either (i) electronic information which is a source of an image recorded on the medium or (ii) electronic information relevant to the electronic information which is the source of the image recorded on the medium. The controller controls such that a specific image representing the electronic information specified by the information specifying unit is displayed on the display screen in accordance with the placement state specified by the state specifying unit.

BRIEF DESCRIPTION OF THE DRAWINGS

Exemplary embodiments of the invention will be described in detail with reference to the accompanying drawings, wherein:

FIG. 2 is a drawing to show an example of a code image used in the exemplary embodiment of the invention;

FIG. 9 is a drawing to show placement states of paper media and display states of images in a coordinate system used in the exemplary embodiment of the invention;

FIG. 10 is a drawing to show contents stored in a placement state management table and a display state management table used in the exemplary embodiment of the invention;

FIG. 11 is a drawing to show contents stored in a document management table and a relevant document management table used in the exemplary embodiment of the invention;

DETAILED DESCRIPTION

The exemplary embodiment(s) of the invention will be described in detail with reference to the accompanying drawings.

In the exemplary embodiment, a horizontal display for plural users to have a discussion with gathering about the display is used as an example of a display. A paper medium carried in by one user is placed on the horizontal display and an electronic document corresponding to the paper medium or a relevant electronic document is shared on a shared screen on the horizontal display, to thereby have a discussion. Then, first the mechanisms of the horizontal display and the paper medium will be described.

To begin with, a first example of the mechanisms of the horizontal display and the paper medium will be described.

Figure 1:
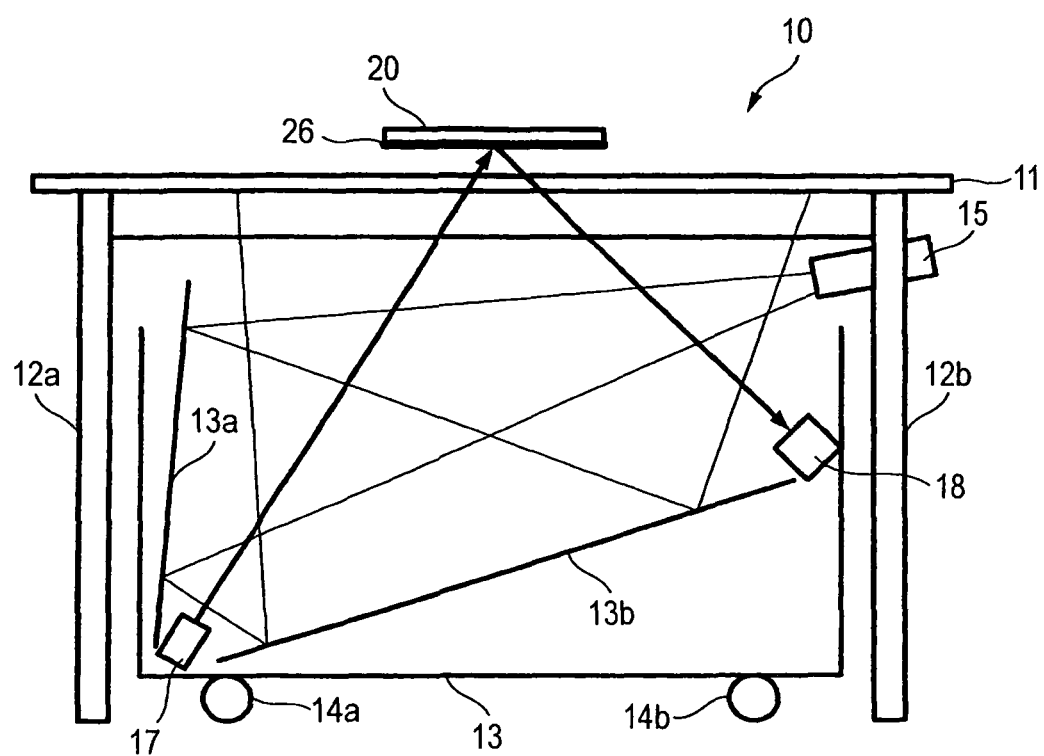
FIG. 1 is a section view of a horizontal display to which an exemplary embodiment of the invention is applied.

FIG. 1 is a section view when a paper medium 20 is placed on a horizontal display 10 in the first example. Usually, the paper medium 20 is in contact with the horizontal display 10, but a gap is provided between the horizontal display 10 and the paper medium 20 in the figure for ease to view.

As shown in the figure, the horizontal display 10 includes a top plate 11 as a workbench for having a discussion, and leg portions 12a to 12d for supporting the top plate 11. The horizontal display 10 also includes a projection unit 13 for projecting an image onto the top plate 11 from its rear, casters 14a to 14d for movably supporting the projection unit 13, and a projector 15 for projecting the image to be projected onto the top plate 11. The horizontal display 10 further includes an infrared light source 17 for irradiating the rear surface of the paper medium 20 with infrared light and an infrared camera 18 for receiving the infrared light reflected on the bottom of the paper medium 20. However, FIG. 1 is a section view and therefore the legs portions 12c and 12d and the casters 14c and 14d do not appear in the figure.

The top plate 11 is circular, for example, so that each user can participate in discussion with standing at any desired position in the surrounding of the top plate 11. For example, a translucent white filter is put on a base material of a glass plate, etc., to form a transmission-type screen so that the top plate 11 functions as a display screen (for example, large screen display) for displaying an image projected by the projection unit 13. Further, the top plate 11 also includes a function of a touch panel for detecting user's operation on the displayed image. The touch panel may be provided by covering the surface of the top plate 11 with a transparent screen where elements for detecting contact are placed or may be provided by running infrared light vertically and horizontally on the surface of the top plate 11 and detecting a position where the infrared is blocked. In the exemplary embodiment, however, the paper medium 20 may be placed on the top plate 11 as shown in the figure. Therefore, it is assumed that the function of the touch panel of the top plate 11 is a function of discriminating between touch with the rear surface of the paper medium 20 and touch as user's operation, for processing. For example, if the touch part exceeds a given area, a signal representing user's operation may be suppressed.

The number of the legs (12a to 12d) is four by way of example, but is not limited to four.

The projection unit 13 is formed of a square pole box with a side surface of the top plate 11 being open and contains mirrors 13a and 13b therein. It is assumed that the mirrors 13a and 13b are fixed at angles as shown in the figure and are attached to side surfaces of the box of the projection unit 13.

The casters 14a to 14d are attached to the rear surface of the projection unit 13 so that the projection unit 13 can be moved with a move of a table made up of the top plate 11, the leg portions 12a to 12d, and the projector 15. However, the relative position of the projection unit 13 to the table is prevented from shifting. The number of the casters is four, but is not limited to four.

The projector 15 is hung from the top plate 11 and is fixed and projects an image in the direction of the mirror 13a. Then, the image is reflected on the mirror 13a and is projected onto the top plate 11.

The infrared light source 17 blinks in a pulse fashion in synchronization with the shutter timing of the infrared camera 18, for example. Accordingly, an area of the top plate 11 where there is a possibility that the paper medium 20 may be placed is irradiated with the infrared light on a regular basis. For example, an infrared LED may be used as the infrared light source 17.

The infrared camera 18 captures an image of the rear surface of the paper medium 20, with which infrared light is irradiated, by an image sensor having sensitivity to the infrared region. The captured image is analyzed. Thereby, an ID and a position of the paper medium 20 are detected. For example, a CMOS sensor or a CCD sensor may be used as the image sensor.

In the exemplary embodiment, an image is thus read with the infrared light, so that video produced by visible light of the projector 15 is not affected. To conduct further reliable projection and ID recognition, a holographic optical element for allowing any other than light at a given angle to pass through may be used in the top plate 11. Alternatively, a method of putting a film, which is electrically changeable between transmission and non-transmission, on the top plate 11 and switching between projection and ID recognition in a short cycle may also be adopted.

It is noted that a code image 26 formed of a color material (for example, toner) having an absorption region in the infrared region is printed on the rear surface of the paper medium 20 so that the ID and the position of the paper medium 20 are detected using the infrared light source 17 and the infrared camera 18.

FIG. 2 is a drawing to show an example of an image forming the code image 26.

First, unit patterns forming the code image 26 will be described.

FIG. 2A shows an example of a unit pattern.

The unit pattern refers to the minimum unit of embedded information. In the figure, black regions and hatched regions are regions where dot can be placed and white regions existing therebetween is regions where a dot cannot be placed. Dots are placed in the black regions of the regions where dot can be placed; dots are not placed in the hatched regions. That is, the figure shows an example in which a unit pattern is formed by placing dots in two positions selected from among the nine positions where dot can be placed. Here, the number of combinations of selecting two positions from among nine positions is equal to 36 ($=_9C_2$) and therefore, 36 types of unit patterns exist. Among them, the four types of unit patterns are used as synchronous patterns. The synchronous patterns are patterns to detect image rotation and specify a relative position of an identification code. Particularly, since it is necessary to detect image rotation, selected as the four types of unit patterns are patterns such that if one of the synchronous patterns is rotated 90 degrees, it becomes another of the synchronous patterns are selected. The 32 types of unit patterns except the four types of unit patterns are used as information patterns representing an identification code, to represent five-bit information.

By the way, the dots shown in FIG. 2A are dots for representing information and do not necessarily match a dot meaning the minimum point forming a part of an image. In the exemplary embodiment, the dot for representing information (minimum square in FIG. 2A) has a size of two dots×two dots in 600 dpi. Since the size of one dot in 600 dpi is 0.0423 mm, one side of the dot for representing information (minimum square in FIG. 2A) is 84.6 μm (=0.0423 mm×2). The dot for representing information may be small as much as possible because the larger the dot becomes, the more conspicuous the dot becomes. However, if the dot is made too small, it cannot be printed by a printer. Then, the above-mentioned value falling within a range of from 50 μm to 100 μm is adopted as the size of the dot for representing information. However, the above-mentioned value 84.6 μm is a numeric value on calculation and the size becomes about 100 μm in an actually printed toner image.

Next, a code block made up of such unit patterns will be described.

FIG. 2B shows an example of layout of a code block. Here, the figure shows a code array just before replacement with a pattern image rather than an image. That is, a unit pattern (any of 36 types of unit patterns) as in FIG. 2A is placed in the minimum square in FIG. 2B (which will be hereinafter referred to as "unit block") and the resultant image is formed on a medium.

In the layout in FIG. 2B, a synchronous code is placed in one unit block in the upper left corner of the code block. An identification code is placed in four unit blocks to the right of the unit block in which the synchronous code is placed and in four unit blocks below the unit block in which the synchronous code is placed. Furthermore, the identification code is placed in 16 (=4×4) unit blocks surrounded by these unit blocks.

In the exemplary embodiment, the ID of the paper medium 20 is coded and used as the identification code in the code image 26. In so doing, if the image captured by the infrared camera 18 is analyzed, the ID of the paper medium 20 is obtained and also it is possible to find which paper medium 20 is placed on the horizontal display 10.

On the other hand, the position of the paper medium 20 on the horizontal display 10 is found based on the position and the size of the code image in the image captured by the infrared camera 18. For example, if the code image exists on the upper side in the image captured by the infrared camera 18, it can be found that the infrared light is received from roughly above in the vertical direction. More specifically, it is assumed that an image is captured so that one side of the infrared camera 18a closer to a table surface is on an upper side of the captured image. In this case, if the portable display 20 is located on the optical axis, the code image appears at the center of the captured image; if the portable display 20 is closer to the infrared camera 18a than the optical axis, the code image appears in the upper portion of the captured image; and if the portable display 2 is farther from the infrared camera 18a than the optical axis, the code image appears in the lower portion of the captured image. If the code image exists on the lower side in the image captured by the infrared camera 18, it can be found that the infrared light is received from a direction closer to the horizontal direction than the vertical direction. The size of the code image 26 is determined in advance and is compared with the size of the code image in the image captured by the infrared camera 18. Thereby, a distance from the infrared camera 18 to the code image 26 is recognized. Then, the position of the paper medium 20 in a three-dimensional space is determined from the found direction and distance K (black containing carbon) toner and special toner are available as the toner used to form the code image 26.

As the special toner, invisible toner having the maximum absorption ratio in a visible light region (400 nm to 700 nm) being 7% or less and the absorption ratio in a near-infrared region (800 nm to 1000 nm) being 30% or more is illustrated. However, "visible" and "invisible" do not have a bearing on whether or not the toner (code image) can be recognized by human's eyes. "Visible" and "invisible" are distinguished depending on whether or not the code image can be recognized according to the presence or absence of color forming property due to absorption of a specific wavelength in the visible light region. If the toner (code image) is hard to recognize with human's eyes although there is some color forming property due to absorption of the specific wavelength in the visible light region, it is also contained in "invisible."

An example of the method for recognizing the ID on the rear surface of the paper medium 20 has been described. However, the ID recognition method is not limited thereto. For example, in the description given above, the ID is printed on the entire rear surface of the paper medium 20. However, the ID may be printed on both sides of the paper medium 20 or may be printed only in a corner rather than on the entire surface. In the description given above, a dot pattern is printed as the ID. However, a previously determined character or symbol may be printed like a pattern. However, also in this case, it is necessary that the ID is unique for each paper medium 20 and has a direction (orientation).

In the exemplary embodiment, the horizontal display 10 is used as an example of a display having a substantially horizontal display screen. It is assumed that the expression "substantially horizontal" does not require that the top plate 11 be completely parallel with the ground or floor face and may be horizontal to such an extent that the paper medium 20 does not fall if the paper medium 20 is placed on the top plate 11. Hereinafter, the case where the exemplary embodiment is applied to the horizontal display 10 will be described, but the exemplary embodiment may be applied to a display of any other type such as a vertical display.

In the exemplary embodiment, the paper medium 20 is used as a medium placed on the horizontal display 10, but the material may be any other than paper so long as an image can be printed thereon. For example, a plastic, a metal, a ceramic, etc., may be used.

By the way, today, user's smooth document work may be prevented because a document output to a physical medium such as the paper medium 20 (paper document) and an electronic document are managed separately and because a new version and an old version are mixed even for the same document. For example, edit made in a paper document must be again executed for an original electronic document later. Double work is required. It is conceivable that diversification of media will constitute a large hindrance to document work. For example, it would be difficult to make a discussion with documents being arranged in a common field when conference participants gather each bringing a document with a different medium.

In view of these circumstances, a means capable of displaying a paper document and an electronic document in association with each other and a means for linking an edit operation of a paper document and that of an electronic document become necessary.

Then, in the exemplary embodiment, display and operation as shown in FIGS. 3 to 7 are implemented using the horizontal display 10.

First, an image display method of an electronic document will be described.

Figure 3:
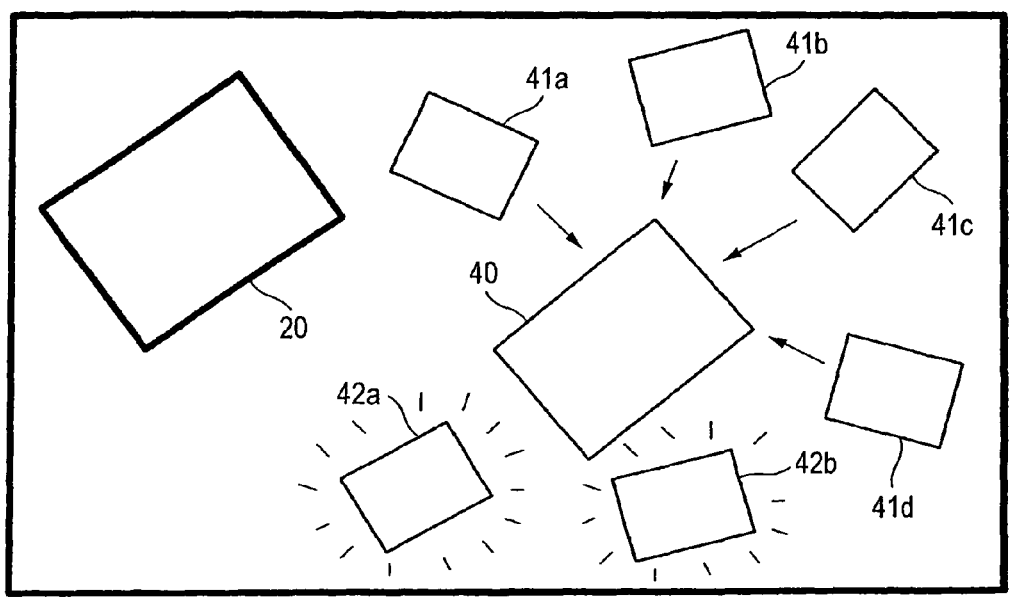
FIG. 3 is a drawing to show a display example in the exemplary embodiment of the invention.

FIG. 3 shows an example in which an image representing an electronic document (original electronic document) corresponding to the paper medium 20 and images representing electronic documents relevant thereto are displayed in the vicinity of the paper medium 20. However, the image of the electronic document corresponding to the paper medium 20 may be displayed just below the paper medium 20.

Specifically, such display is produced according to the following operation:

First, the paper medium 20 is placed on the horizontal display 10. Then, an image 40 (for example, window) of the electronic document corresponding to the paper medium 20 is displayed. The images of the electronic documents relevant to this electronic document are also displayed in the surrounding thereof. At this time, if the images of the relevant electronic documents are already displayed on the screen, it is advisable to display them so that the images of the relevant electronic documents gather around the image 40. Images 41*a* to 41*d* show the images of the documents gathering around the image 40. On the other hand, if the images of the relevant electronic documents are not displayed on the screen, it is advisable to display them so that the images of the relevant electronic documents suddenly appear in the surrounding of the image 40. Images 42*a* and 42*b* show such suddenly appearing images.

Here, the relevant electronic documents are as follows:

For example, the relevant electronic document is another electronic document that is referenced when one electronic document is created. In this case, if another electronic document is opened for a given time or more during creation of one electronic document, it may be determined that the other electronic document is the relevant electronic document.

Also, the relevant electronic document may be an electronic document associated by user's intention. If the user surrounds images of electronic documents displayed on the horizontal display 10 with his or her finger or connects images of electronic documents by a line, the electronic documents may be associated with each other.

Further, when the relevant electronic documents are stored, not only relevance but also a display state, on the display screen, of each electronic document when associated, such as a position, an angle and a display size, may be stored. In so doing, situation at the associating time is reproduced at a calling time. When a position is stored, the stored position may be an absolute position on the display screen of the horizontal display 10 or may be a relative position to a certain document (electronic document or paper document). Here, reproducing of the display state at the time of an associating operation has been described. However, the reproduced display state is not limited thereto, and may be a display state at any point in time in the past.

FIGS. 4 and 5 show examples in which an electronic document including plural pages is displayed.

In this case, the following display methods are available:

A first method is to display only a front page with all pages being put on each other.

A second method is to display a list of all pages.

A third method is to display a part of pages, such as adjacent pages or any desired pages.

FIG. 4 shows a display example according to the second display method.

Figure 4A:
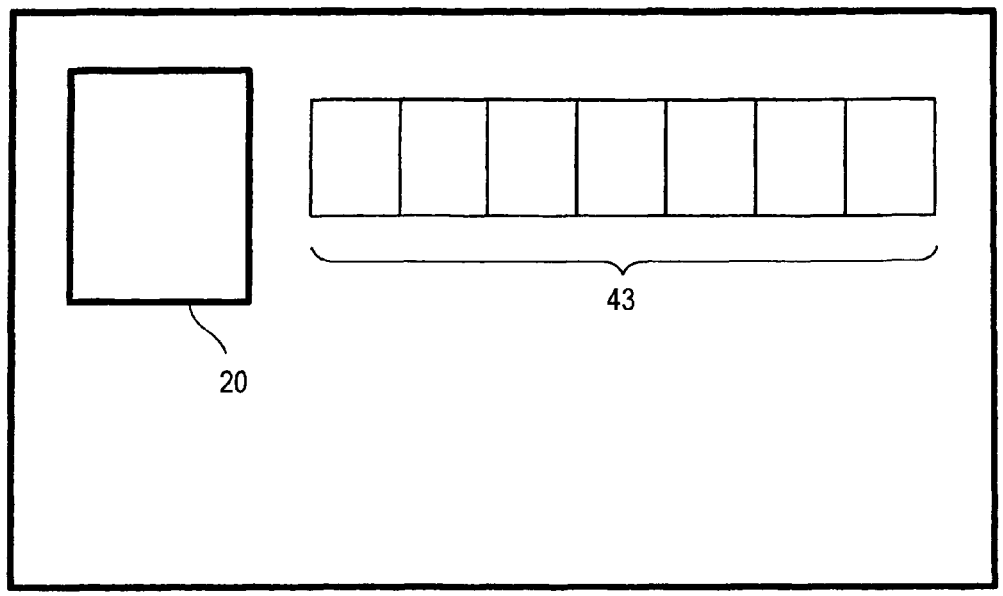
FIG. 4 is a drawing to show a display example in the exemplary embodiment of the invention.

In FIG. 4A, if the paper medium 20 is placed on the horizontal display 10, an image 43 representing a list of all pages of an electronic document corresponding to the paper medium 20 is displayed to the right of the paper medium 20. Here, an example in which the image 43 fits on a screen of the horizontal display 10 is shown. However, the image 43 may not fit on the screen. In such a case, the image 43 may be displayed with being reduced or a symbol indicating that not all pages are displayed may be displayed together with the image 43.

Figure 4B:
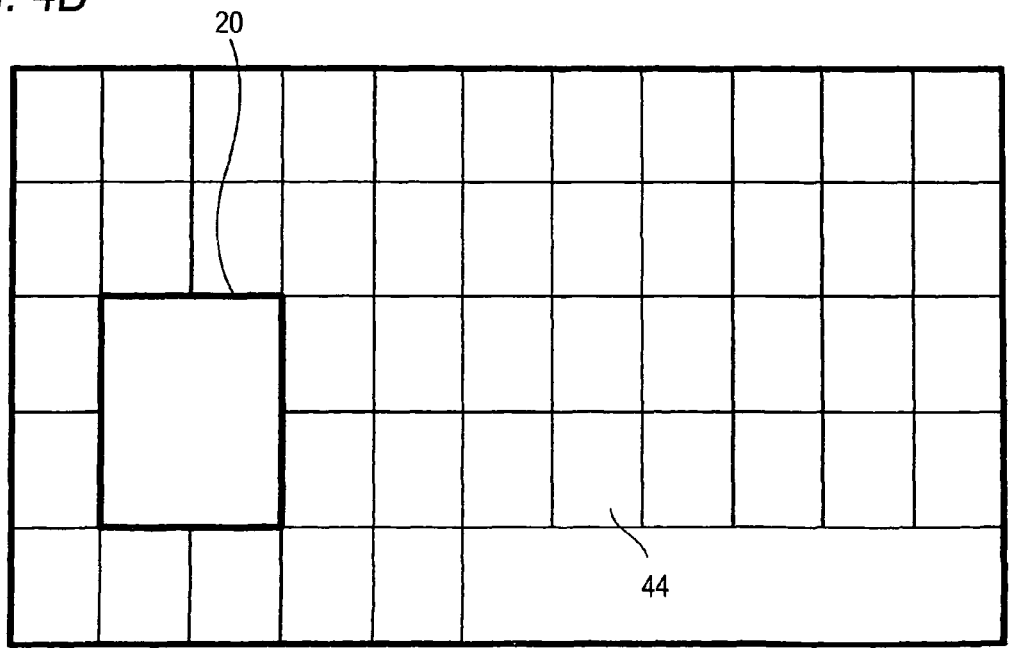

In FIG. 4B, if the paper medium 20 is placed on the horizontal display 10, images 44 of the respective pages of the electronic document corresponding to the paper medium 20 are displayed so that the images 44 are spread all over the surrounding of the paper medium 20. This is an effective display method when the paper medium 20 is placed so that the frame of the screen of the horizontal display 10 and the contours of the paper medium 20 become roughly parallel to each other.

FIG. 5 shows a display example according to the third display method. This example is to display several pages preceding and following a page which is a source of an image recorded on the paper medium 20, among the plural pages of the electronic document corresponding to the paper medium 20 when the paper medium 20 is placed on the horizontal display 10.

Figure 5A:
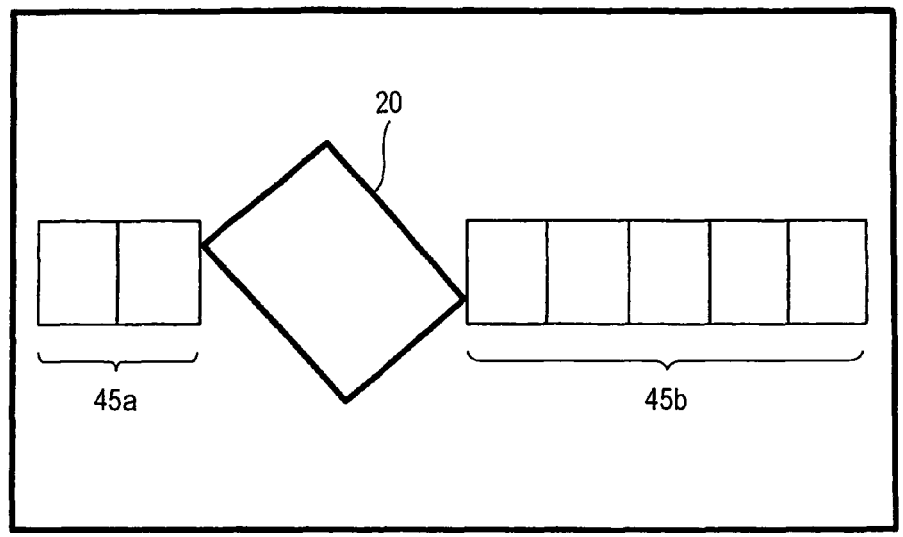
FIG. 5 is a drawing to show a display example in the exemplary embodiment of the invention.

In FIG. 5A, an image 45a, that represents a state where the preceding pages are arranged, is displayed to the left of the paper medium 20. Also, an image 45b, that represents a state where the following pages are arranged, is displayed to the right of the paper medium 20.

Figure 5B:
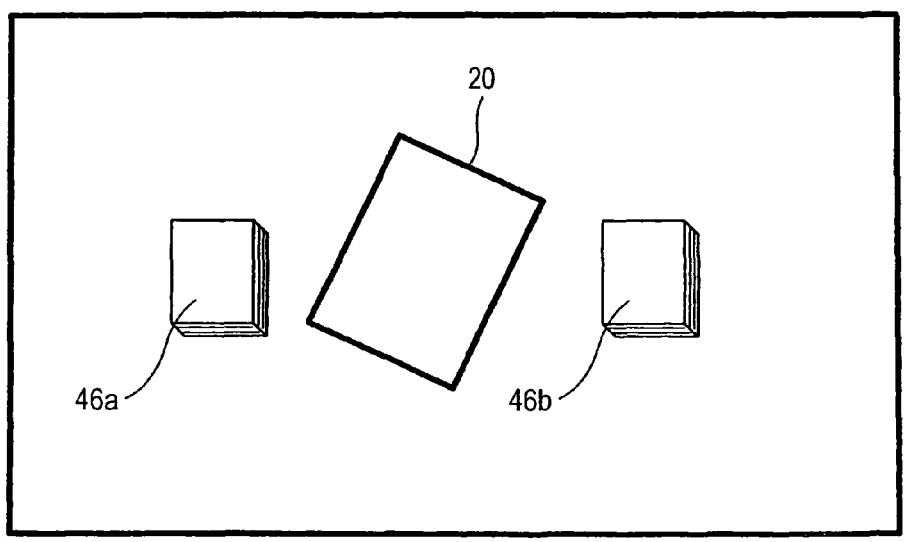

In FIG. 5B, an image 46a, that represents a state where the preceding pages are bundled, is displayed to the left of the paper medium 20. Also, an image 46b, that represents a state where the following pages are bundled, is displayed to the right of the paper medium 20.

Here, as compared with the page which is the source of the image recorded on the paper medium 20, the preceding pages are displayed to the left and the following pages are displayed to the right. However, the sequence relation is not limited to the page sequence and the display position is not limited to the left or the right either. That is, an image may be displayed in accordance with preceding and following in a predetermined sequence relation.

By the way, in the exemplary embodiment, the ID on the rear surface of the paper medium 20 is read continuously. Therefore, if the paper medium 20 is rotated, the image of the electronic document also rotates in synchronization. If the paper medium 20 is moved, the image of the electronic document also moves accordingly. Further, if the paper medium 20 is lifted up to a predetermined height or more from the horizontal display 10, the image of the electronic document disappears.

The image of the electronic document may be displayed in an equal size, but the display size may be changed as required.

Next, an operation of linking edit of a paper document and edit of an electronic document will be described.

In the exemplary embodiment, for example, if the following edit is executed for a paper document, the same edit is also reflected on the electronic document liked with the paper document for display:

A first edit is to collect plural documents into a single document having plural pages.

A second edit is to divide a single document having plural pages into plural documents.

A third edit is to delete any desired page of a single document having plural pages.

A fourth edit is to sort any desired pages of a single document having plural pages.

A fifth edit is to rotate any desired page of a single document having plural pages.

A sixth edit is to write using a so-called electronic pen for recording input information as electronic data.

A seventh edit is to erase some or all of page.

Methods of storing a result of the edit for the electronic document are as follows:

For example, a user may lift up a paper document to the predetermined height or more from the horizontal display 10 and tap the screen of the horizontal display 10 any number of times with an edge of the paper document, thereby giving a command for storing the edit result of the electronic document. This is an extremely natural manner of aligning the edges of sheets of paper which are put on each other in a disorderly fashion and collecting the sheets of paper into one bundle after the termination of a conference, etc.

The edit result of the electronic document may be stored by raising a paper document on the display surface of the horizontal display 10.

Further, if a paper document is lifted up to the predetermined height or more from the horizontal display 10, the electronic document disappears (become not displayed). This operation may be adopted as a command for storing the edit result of the electronic document.

Alternatively, if the user aligns pages of a paper document having plural pages, the edit result of the electronic document may be stored.

Recognition of overlap, division, sort, etc., in a paper document will be described.

FIG. 6 is a drawing to describe recognition of overlap of a paper document.

Figure 6A:
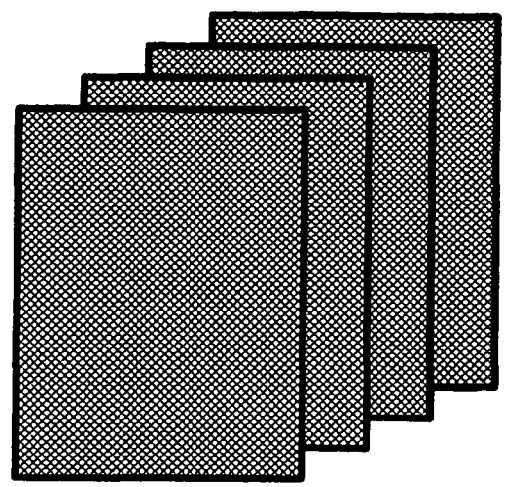
FIG. 6 is a drawing to show an operation example in the exemplary embodiment of the invention.

FIG. 6A shows the case where plural paper media 20 are shifted little by little and are put on each other. In the figure, the paper media 20 are viewed from the rear surface and the code images 26 are printed on the entire surface as indicated by a crosshatch. The plural paper media 20 are thus read in batch with being shifted.

Figure 6B:
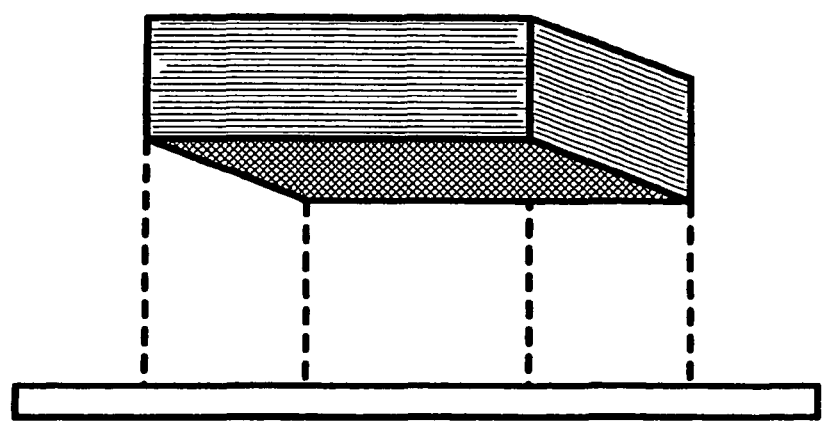

FIG. 6B shows the case where plural paper media 20 are recognized as a bundle. After the plural paper media 20 are recognized, if paper sheets are put on each other, an overlap degree is detected. If the overlap occurs in a predetermined area or more, the plural paper media 20 are recognized as a bundle.

FIG. 7 is a drawing to show division and sort of a paper document.

Figure 7A:
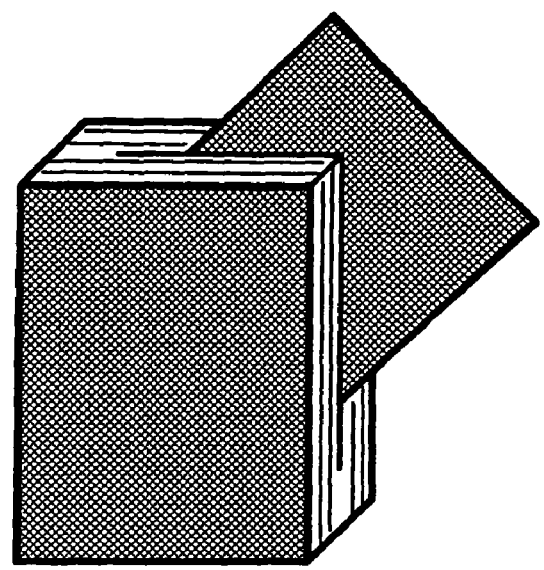
FIG. 7 is a drawing to show an operation example in the exemplary embodiment of the invention.

FIG. 7A shows the case where any desired paper medium 20 is extracted from plural paper media 20 recognized as a bundle. In this case, the code image 26 on the rear surface of the extracted paper medium 20 is again exposed. Accordingly, the extracted paper medium 20 is recognized as a single paper medium 20.

Figure 7B:
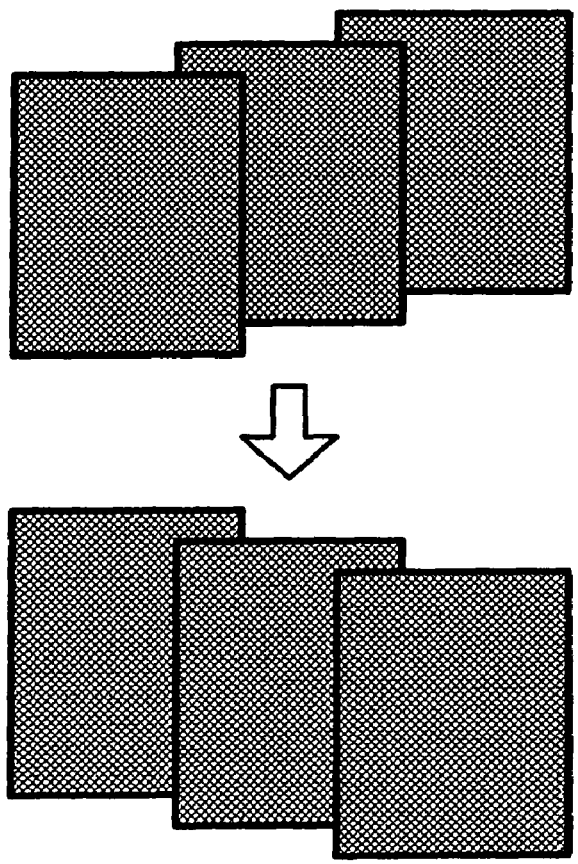

FIG. 7B shows the case where an overlap sequence of paper media 20 is changed. If any desired paper medium 20 is put on another paper medium 20, an overlap sequence is recognized from how each code image 26 on the back is cut.

For example, FIG. 7B is a drawing of the overlapping paper media 20 when viewed from the rear surface. It is assumed that the paper ID of the left paper medium 20 is "P002," that the paper ID of the center paper medium 20 is "P003," and that the paper ID of the right paper medium 20 is "P004." At this time, in the upper portion of FIG. 7B, the paper ID "P002" is recognized in a rectangular region. The paper ID "P003" is recognized in a region where the region where the paper ID "P002" is recognized is excluded from a rectangular region. Further, the paper ID "P004" is recognized in a region where the region where the paper ID "P003" (and the paper ID "P002") is recognized is excluded from a rectangular region. When such a recognition result is analyzed, it can be found that the left paper medium 20 is on the bottom, that the center paper medium 20 is put thereon, and that the right paper medium 20 is put thereon. Therefore, if the paper media 20 are sorted from the state shown in the upper portion of FIG. 7B to the state shown in the lower portion of FIG. 7B, the sort can be recognized.

Next, the configuration of a display system for implementing such schematic operation will be described.

Figure 8:
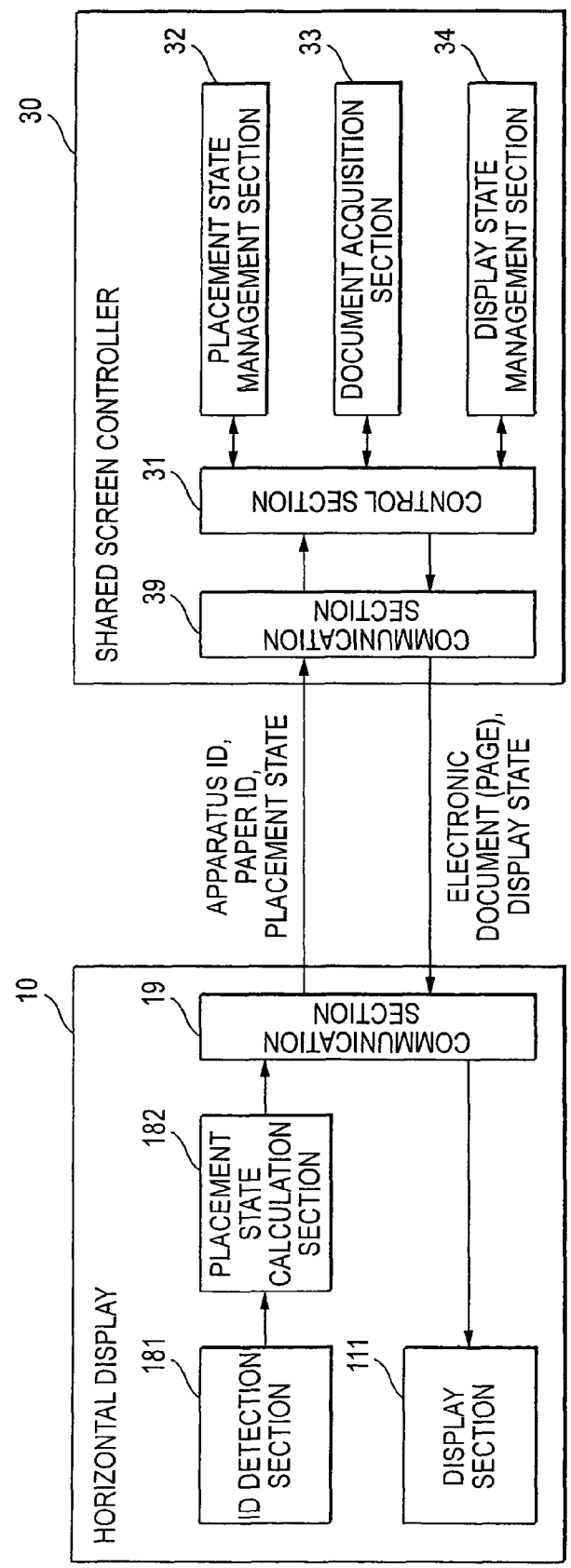
FIG. 8 is a drawing to show a configuration example of a display system in the exemplary embodiment of the invention.

FIG. 8 is a diagram to show a configuration example of the display system in the exemplary embodiment.

As shown in the figure, the display system of the exemplary embodiment includes the horizontal display 10 and a shared screen controller 30 for controlling a shared screen on the horizontal display 10. The horizontal display 10 and the shared screen controller 30 are connected by a LAN, for example. In the figure, only one horizontal display 10 is connected to one shared screen controller 30. However, plural horizontal displays 10 may be connected to the shared screen controller 30.

The internal functional configurations of the respective apparatus will be described.

The horizontal display 10 includes a display section 111 for performing an image display process, an ID detection section 181 for detecting an ID of a paper medium 20 (which will be hereinafter referred to as a "paper ID"), a placement state calculation section 182 for calculating a position, an orientation, a size, etc., of the paper medium 20 on the top plate 11 (which will be hereinafter referred to as a "placement state"), and a communication section 19 for transmitting and receiving information to and from the shared screen controller 30.

The display section 111 outputs an image to be projected onto the top plate 11 to the projector 15 in accordance with information concerning the display state received by the communication section 19 from the shared screen controller 30, for example, information concerning the display position and the display direction (orientation).

The ID detection section 181 analyzes an image captured by the infrared camera 18, to thereby detect the paper ID.

The placement state calculation section 182 analyzes the image captured by the infrared camera 18, to thereby detect the placement state.

The communication section 19 transmits an ID of the communication section 19, the paper ID, and information concerning the placement state to the shared screen controller 30 and receives an electronic document and the information concerning the display state in the display section 111 from the shared screen controller 30.

The shared screen controller 30 includes a control section 31 for controlling the operation of the entire controller, a placement state management section 32 for managing the placement state of the paper medium 20 on the horizontal display 10, a document acquisition section 33 for acquiring an electronic document to be displayed on the horizontal display 10, a display state management section 34 for managing the display state of the image on the horizontal display 10, and a communication section 39 for transmitting and receiving information to and from the horizontal display 10.

The control section 31 takes out the paper ID and the placement state received by the communication section 39, passes necessary information to the placement state management section 32, the document acquisition section 33, and the display state management section 34, to control the operation.

The placement state management section 32 conducts management as to which paper medium 20 is placed on which horizontal display 10. The placement state management section 32 also conducts management as to how the paper medium 20 overlaps in what orientation at what position. That is, in the exemplary embodiment, the placement state management section 32 is provided as an example of a state specifying unit that specifies a placement state of a medium and as an example of a state specifying unit that specifies an overlap state of media.

The document acquisition section 33 specifies a page of an electronic document to be displayed on the horizontal display 10 and reads the page of the electronic document from a document server (not shown), a memory (not shown) in the shared screen controller 30 in which the electronic document is previously stored, etc. Here, the electronic document is an example of electronic information which is a source of an image recorded on a medium. In the exemplary embodiment, the document acquisition section 33 is provided as an example of an information specifying unit that specifies electronic information.

The display state management section 34 determines and manages an image of which page of which electronic document is to be displayed at which position of the horizontal display 10. The image of the page of the electronic document is an example of a specific image representing electronic information. In the exemplary embodiment, the display state management section 34 is provided as an example of a controller for controlling display.

The communication section 39 receives an apparatus ID, the paper ID, and information concerning the placement state from the horizontal display 10. The communication section 39 also transmits an electronic document and information concerning the display state to the horizontal display 10.

In the system configurations shown in FIG. 8, the shared screen controller 30 is provided separately from the horizontal display 10. However, the shared screen controller 30 may be provided integrally with the horizontal display 10. If such a configuration is adopted, it is not necessary to manage the apparatus ID in the management information.

Next, a placement state management table that is referenced and updated by the placement state management section 32, a display state management table that is referenced and updated by the display state management section 34, and a document management table and a relevant document management table that are referenced by the document acquisition section 33 will be described. It is advisable to store these tables in a main memory 92 or a magnetic disk unit 93 described later. Here, the table format is shown as a matter of convenience; any format may be adopted so long as a similar correspondence relation can be managed.

Before the tables are described, first a method for representing the placement state of paper media 20 on the horizontal display 10 and the display state of an image on the horizontal display 10 will be described.

FIG. 9 shows an example in which paper media 20 are placed on a screen of the horizontal display 10 and images are displayed. Here, each paper medium 20 is represented by a frame having a thick solid line and each image is represented by a frame having a thin solid line. The position, the direction (orientation), the size, and the overlap of each of the paper media 20 and the images are represented using six parameters, that is, X coordinate and Y coordinate of a center point, a width, a height, an inclination, and a layer (depth).

The coordinates of the center point are represented using a coordinate system as shown in FIG. 9. Here, it is assumed that the screen is rectangle and the center point of the screen is the origin. An X axis is taken in the longer direction and a Y axis is taken in the shorter direction. One defined in response to the size of the screen such as mm or cm may be used as an unit in X coordinate and Y coordinate.

The width and the height are lengths represented by a numeric value using the coordinate units.

The inclination, for example, is an angle with respect to the positive direction of the X axis although not shown in the figure.

Further, if the paper media 20 and the images overlap, the layer may be a numeric value representing how many media are present when counting from the bottom to a paper medium or an image in question. If it is hidden in the bottom, the layer is "1." If it is put on the top, the layer is the same numeric value as the number of overlapped paper media 20. The layer is found by a method as previously described with reference to FIG. 7B, for example.

A specific description is given below using the example shown in FIG. 9:

FIG. 9 shows four paper media.

First, one is a paper medium having a width W1 and a height H1 with its center located at (X1,Y1). An inclination of the paper medium is G1 although not shown in the figure. The paper medium is not in an overlap state and therefore a layer L1 of the paper medium is "1."

Other three paper media form a bundle of paper media and the top is a paper medium having a width W2 and a height H2 with its center located at (X2, Y2). An inclination of the paper medium is G2 although not shown in the figure. This paper medium is the top of the bundle made up of the three paper media and therefore, a layer L2 of this paper medium is "3." On the other hand, the second paper medium counted from the top and the bottom paper medium are hidden. The former has a center (X3, Y3), a width W3, a height H3, and an inclination G3, and a layer L3 of this paper medium is "2." Also, the latter has a center (X4,Y4), a width W4, a height H4, and an inclination G4, and a layer L4 of the paper medium is "1."

FIG. 9 also shows five images.

First, three images are displayed only near the single paper medium placed. One of the three images is an image having a width W5 and a height H5 with its center located at (X5,Y5). An inclination of this image is G5 although not shown in the figure. This image is not in an overlap state and therefore, a layer L5 of this image is "1." Another one is an image having a width W6 and a height H6 with its center located at (X6,Y6). An inclination of the other image is G6 although not shown in the figure. The other image is not in an overlap state and therefore, a layer L6 of the other image is "1." Still another one is an image having a width W7 and a height H7 with its center located at (X7, Y7). An inclination of the still other image is G7 although not shown in the figure. The still other image is not in an overlap state and therefore, a layer L7 of the still other image is "1."

Further other two images are displayed to the left and the right of the paper bundle made up of the three paper media. One of the further other two images is an image having a width W8 and a height H8 with its center located at (X8,Y8). An inclination of the one of the images is G8 although not shown in the figure. The one of the images is not in an overlap state and therefore, a layer L8 of the image is "1." The other is an image having a width W9 and a height H9 with its center is located at (X9, Y9). An inclination of the other is G9 although not shown in the figure. The other is not in an overlap state and therefore, a layer L9 of the image is "1."

Next, the above-mentioned tables will be described in order with the assumption that the paper media 20 and the images are arranged (placed) as described above.

First, the placement state management table will be described.

FIG. 10A is a drawing to show specific contents of the placement state management table. Here, the apparatus ID of the horizontal display 10 provided with the screen shown in FIG. 9 is set to "A001" and is stored. The paper IDs of the paper medium having its center at (X1, Y1), the paper medium having its center at (X2, Y2), the paper medium having its center at (X3,Y3), and the paper medium having its center at (X4, Y4) are set to "P001," "P002," "P003," and "P004." Further, the three paper media having the paper IDs "P002," "P003," and "P004" are recognized as a paper bundle. Therefore, bundle ID "B001" is set.

Second, the display state management table will be described.

FIG. 10B is a drawing to show specific contents of the display state management table. Here, the apparatus ID of the horizontal display 10 provided with the screen shown in FIG. 9 is set to "A001" and is stored. The pages represented by the image having its center at (X5, Y5), the image having its center at (X6,Y6), the image having its center at (X7,Y7), the image having its center at (X8,Y8), and the image having its center at (X9,Y9) are a fourth page of an electronic document having a document ID "D001," a first page of an electronic document having a document ID "D011," a first page of an electronic document having a document ID "D012," a third page of an electronic document having a document ID "D002," and a fifth page of the electronic document having the document ID "D002," respectively.

Third, the document management table will be described.

FIG. 11A is a drawing to show specific contents of the document management table. The document management table is used to conduct management as to which page of which electronic document is printed on which paper medium. Here, stored are that the fourth page of the electronic document having the document ID "D001" is printed on the paper medium having the paper ID "P001," that a fourth page of the electronic document having the document ID "D002" is printed on the paper medium having the paper ID "P002," that a second page of an electronic document having a document ID "D003" is printed on the paper medium having the paper ID "P003," and that a sixth page of an electronic document having a document ID "D004" is printed on the paper medium having the paper ID "P004."

Fourth, the relevant document management table will be described.

FIG. 11B is a drawing to show specific contents of the relevant document management table. The relevant document management table is used to conduct management as to which page of which electronic document and which page of which another electronic document are associated with each other. The relevant document management table also stores information concerning display states of images representing the electronic documents at a time when the electronic documents are associated with each other. Here, the fourth page of the electronic document having the document ID "D001" is associated with the first page of the electronic document having the document ID "D011" and the first page of the electronic document having the document ID "D012." When they are associated with each other, the fact that an image representing the fourth page of the electronic document having the document ID "D001" is displayed with a center located at (X5, Y5), a width W5, a height H5, an inclination G5, and a layer 5, the fact that an image representing the first page of the electronic document having the document ID "D011" is displayed with a center located at (X6, Y6), a width W6, a height H6, an inclination G6, and a layer 6, and the fact that an image representing the first page of the electronic document having the document ID "D012" is displayed with a center located at (X7, Y7), a width W7, a height H7, an inclination G7, and a layer 7.

Next, the operation of the display system of the exemplary embodiment will be described.

In FIG. 8, first in the horizontal display 10, the ID detection section 181 detects the paper ID, the placement state calculation section 182 calculates the placement state, and the communication section 19 transmits these pieces of information (the paper ID and the placement state) together with the apparatus ID to the shared screen controller 30.

Accordingly, the operation of the shared screen controller 30 starts. Here, the operation for implementing the display shown in FIG. 3 and the operation for implementing the display shown in FIGS. 4 and 5 will be described separately.

Figure 12:
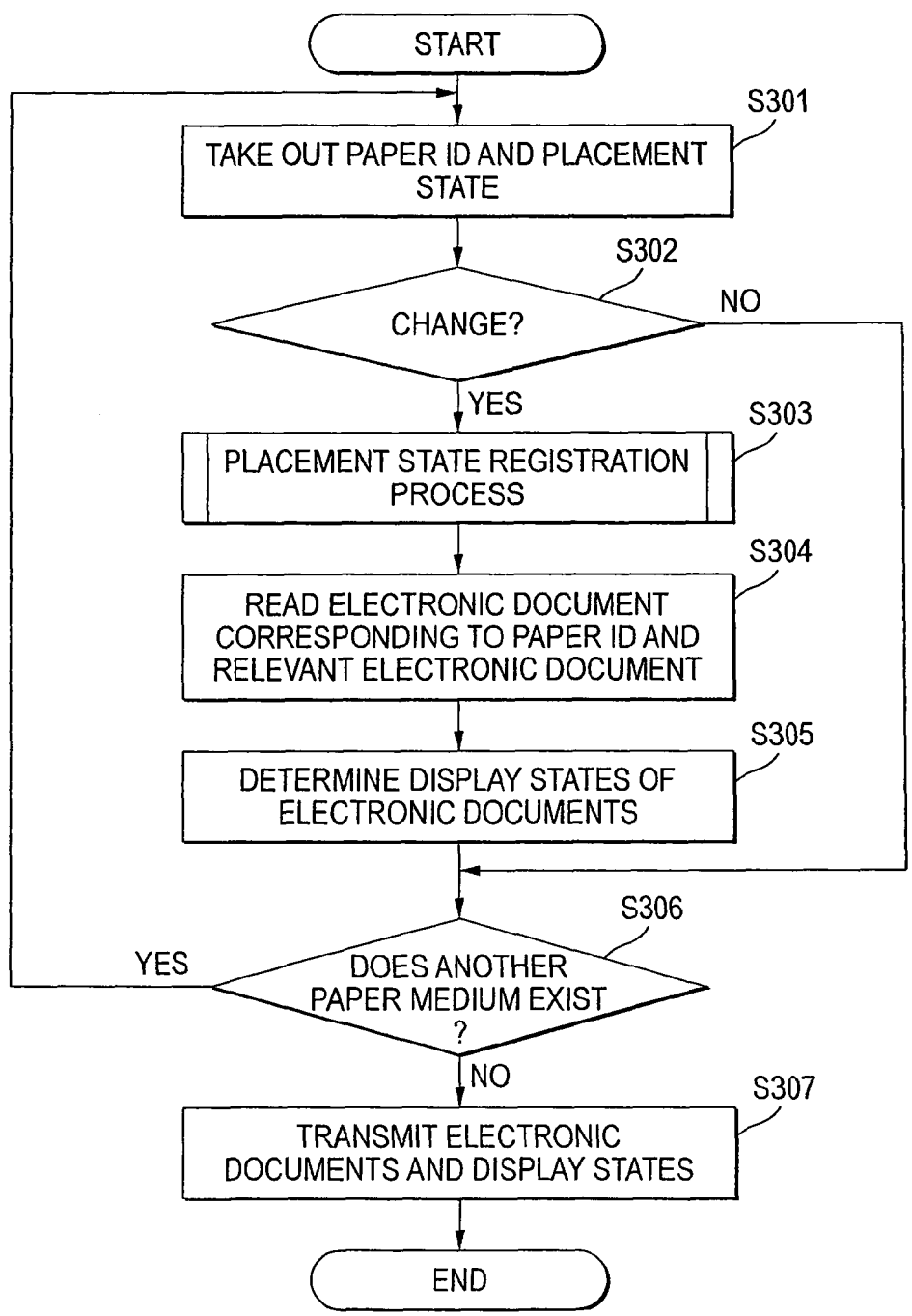
FIG. 12 is a flowchart to show a first operation example of a shared screen controller in the exemplary embodiment of the invention.

FIG. 12 is a flowchart to show the operation of the shared screen controller 30 to implement the display shown in FIG. 3. Before the operation, it is assumed that plural combinations of the apparatus ID, the paper ID, and the placement state received by the communication section 39 are stored in the memory. However, when the information received from the same horizontal display 10 is processed, the apparatus IDs are identical. Therefore, in the following description, the apparatus ID will not be mentioned unless otherwise necessary.

In this state, in the shared screen controller 30, the control section 31 takes out the paper ID and the placement state from the memory and passes them to the placement state management section 32 (step 301).

Accordingly, the placement state management section 32 determines as to whether or not change occurs in the paper ID and the placement state (step 302). That is, first, the placement state management section 32 searches the placement state management table shown in FIG. 10A using the paper ID taken at step 301 as a key to acquire the placement state. Then, the placement state management section 32 determines as to whether or not the six parameters of the found placement state match the six parameters of the placement state taken out at step 301. If all parameters match, the determination result is "no change;" if all parameters don't match, the determination result is "change."

If the determination result is "no change," the process goes to step 306. If the determination result is "change," the placement state management section 32 performs a placement state registration process (step 303). The placement state registration process is described later.

When the placement state registration process is finished, the control section 31 instructs the document acquisition section 33 to read an electronic document corresponding to the paper ID and an electronic document relevant to this electronic document. Accordingly, the document acquisition section 33 reads the electronic documents (step 304). That is, the document acquisition section 33 searches the document management table shown in FIG. 11A using the paper ID as a key and acquires a document ID and page number. The document acquisition section 33 reads a corresponding page of a corresponding electronic document based on the document ID and the page number. The document acquisition section 33 searches the relevant document management table shown in FIG. 11B using the document ID and the page number as keys to acquire a document ID and page number of the relevant electronic document. The document acquisition section 33 reads a page of the relevant electronic document based on the document ID and the page number. In the exemplary embodiment, information concerning the display state of the images of the pages of the electronic documents at a time when the electronic documents are associated with each other is also acquired. That is, when the document acquisition section 33 searches the relevant document management table shown in FIG. 11B using the document ID and the page number as keys, the display states of the pages of the electronic documents associated with each other are acquired. The information thus acquired is returned to the control section 31.

Then, the control section 31 instructs the display state management section 34 to determine the display states of the images of the electronic documents. Accordingly, the display state management section 34 determines the display states (step 305). Each display state includes a display position, a display direction (orientation), a display size, etc. The display state management section 34 may determine these display states in accordance with the placement positions of the paper media 20. The display position may be set in the vicinity of or just below the placement position of the paper medium 20, for example, as shown in FIG. 3. The display positions of the images of the relevant electronic documents may be determined so that the images of the relevant electronic documents are arranged uniformly in the surrounding of the image of the electronic document corresponding to the paper ID. The information concerning the display states thus determined is registered in the display state management table shown in FIG. 10B and is also returned to the control section 31.

Next, the control section 31 determines as to whether or not information concerning an unprocessed paper medium 20 exists in the memory of the communication section 39 (step 306).

As a result, if information concerning an unprocessed paper medium 20 exists, steps 301 to 305 are repeated. On the other hand, if information concerning an unprocessed paper medium 20 does not exist, plural combinations of the electronic documents read at step 304 and the information concerning the display states determined at step 305 are transmitted to the horizontal display 10 (step 307).

If the paper medium 20 having the paper ID and the placement state taken out at step 301 overlap another paper medium, steps 302 to 305 are executed for plural paper media 20 having the overlap portion (which will be hereinafter referred to as a "paper medium group"). Each paper medium contained in the paper medium group may have an overlap portion with at least another paper medium 20 and need not have an overlap portion with all the other paper media 20. At step 302, for such a paper medium group, whether or not change occurs as the whole paper medium group is determined, and the placement state registration process at step 303 is also performed in paper-medium-group units.

Of the paper medium groups, particularly a paper medium group having an overlap portion, exceeding a predetermined threshold value, with all of the paper media of the group is called a "paper medium bundle." An example of the paper medium bundle is paper media 20 recognized as a bundle as shown in FIG. 6B. In the exemplary embodiment, at step 304, a paper ID conversion process is performed for the paper medium bundle. That is, for the paper medium group treated as a paper medium bundle, an electronic document is specified using a paper ID put on the paper medium on the top of the bundle without an electronic document being specified using the paper ID taken out at step 301. Specifically, the placement state management section 32 first references the placement state management table and determines as to whether or not a bundle ID corresponding to the paper ID is blank. If the bundle ID is blank, it means that the paper medium does not form a part of the paper medium bundle. If the bundle ID is not blank, the paper medium forms a part of the paper medium bundle and thus, the placement state management section 32 searches for a paper medium 20 having the maximum value of layers contained in the placement state corresponding to the same bundle ID and specifies an electronic document using a paper ID of the found paper medium 20.

Further, in the exemplary embodiment, a mode in which the determination result at step 302 is "change" contains (i) the case where the paper medium 20 is removed, (ii) the case where a new paper medium 20 is placed and (iii) the case where the placement state of an already placed paper medium 20 is changed. In the first case, information concerning the removed paper medium 20 may be deleted from the placement state management table at step 303, a document ID and page number corresponding to a paper ID of the removed paper medium 20 may be specified at step 304, the information concerning the document ID and the page number may be deleted from the display state management table at step 305, and a command for erasing an image corresponding to the document ID and the page number may be transmitted at step 307.

Figure 13:
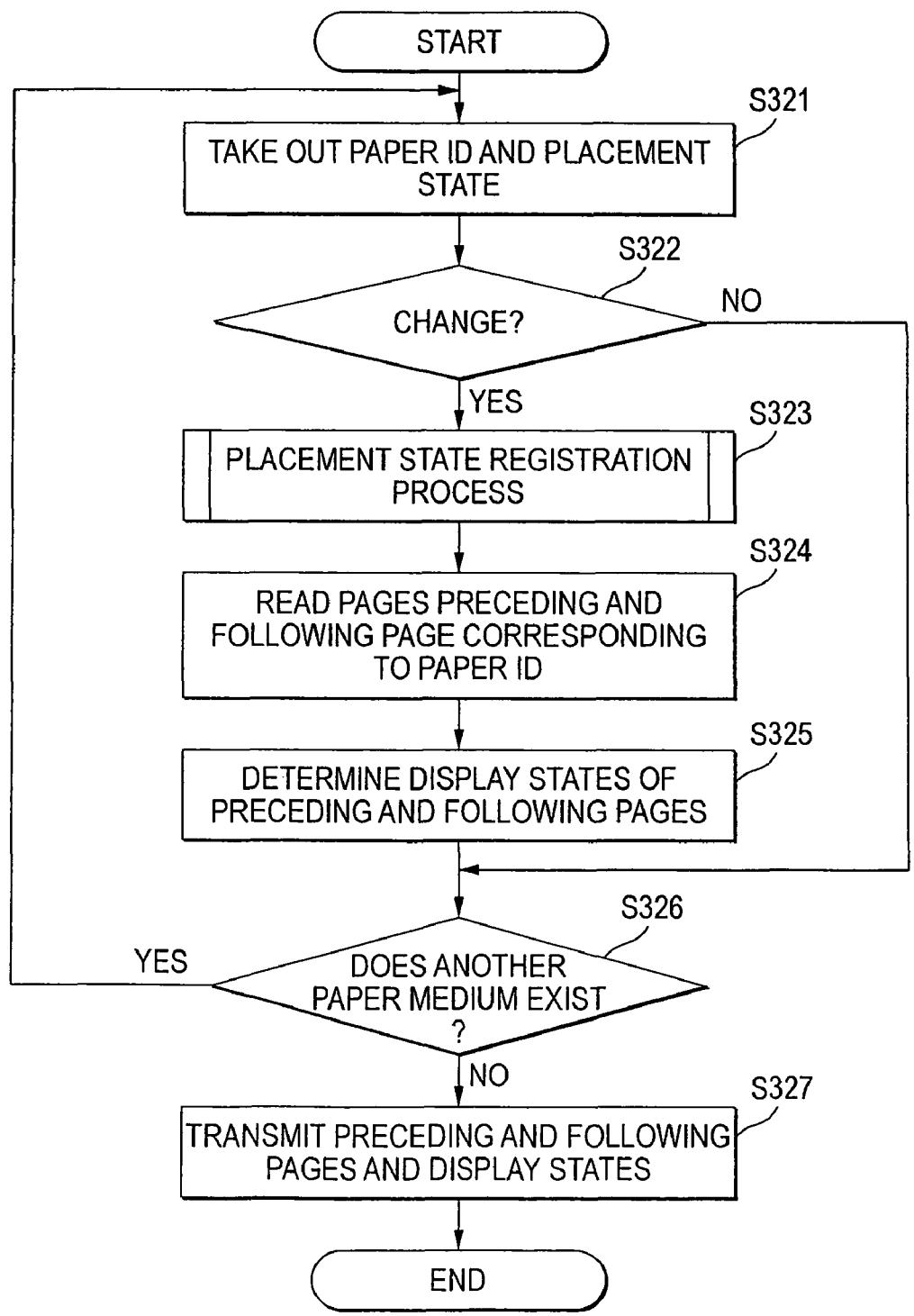
FIG. 13 is a flowchart to show a second operation example of the shared screen controller in the exemplary embodiment of the invention.

On the other hand, FIG. 13 is a flowchart to show the operation of the shared screen controller 30 to implement the display in FIGS. 4 and 5. Before the operation, it is assumed that plural combinations of an apparatus ID, a paper ID, and a placement state received by the communication section 39 are stored in the memory. However, when information received from the same horizontal display 10 is processed, the apparatus IDs are identical. Therefore, in the following description, the apparatus ID is not mentioned unless otherwise necessary.

In this state, in the shared screen controller 30, the control section 31 takes out a paper ID and a placement state from the memory and passes them to the placement state management section 32 (step 321).

Accordingly, the placement state management section 32 determines as to whether or not change occurs in the paper ID and the placement state (step 322). That is, first, the placement state management section 32 searches the placement state management table in FIG. 10A using the paper ID taken at step 321 as a key to acquire a placement state. Then, the placement state management section 32 determines as to whether or not six parameters of the found placement state match six parameters of the placement state taken out at step 321. If all parameters match, the determination result is "no change;" if not all parameters match, the determination result is "change."

If the determination result is "no change," the process goes to step 326. If the determination result is "change," the placement state management section 32 performs a placement state registration process (step 323). The placement state registration process is described later.

When the placement state registration process is finished, the control section 31 instructs the document acquisition section 33 to read pages preceding and following a page of an electronic document corresponding to the paper ID. Accordingly, the document acquisition section 33 reads the required pages (step 324). That is, the document acquisition section 33 searches the document management table in FIG. 11A with the paper ID as a key and acquires a document ID and page number. The document acquisition section 33 reads pages other than the page of the corresponding electronic document based on the document ID and the page number. The information thus acquired is returned to the control section 31.

Then, the control section 31 instructs the display state management section 34 to determine a display states of the images of the electronic documents. Accordingly, the display state management section 34 determines the display states (step 325). The display state includes a display position, a display direction (orientation), a display size, etc. The display state management section 34 may determine the display state in accordance with the placement positions of the paper media 20. The display position may be set at the left and/or the right of the placement position of the paper medium 20 or may be set on the full face except the placement position of the paper medium 20, for example, as shown in FIGS. 4 and 5. Information concerning the display state thus determined is registered in the display state management table shown in FIG. 10B and is also returned to the control section 31.

Next, the control section 31 determines as to whether or not information concerning an unprocessed paper medium 20 exists in the memory of the communication section 39 (step 326).

As a result, if information concerning an unprocessed paper medium 20 exists, steps 321 to 325 are repeated. On the other hand, if information concerning an unprocessed paper medium 20 does not exist, the plural combinations of the electronic documents read at step 324 and the information concerning the display state determined at step 325 are transmitted to the horizontal display 10 (step 327).

If the paper medium 20 having the paper ID and the placement state taken out at step 321 overlap another paper medium, steps 322 to 325 are executed for plural paper media 20 having the overlap portion (paper medium group). Here, each paper medium contained in the paper medium group may be a paper medium 20 having an overlap portion with at least another paper medium 20 and need not be a paper medium 20 having an overlap portion with all of the other paper media 20. At step 322, for such a paper medium group, whether or not change occurs as a whole paper medium group is determined, and the placement state registration process at step 323 is also performed in paper-medium-group units.

Of the paper medium groups, particularly a paper medium group having an overlap portion, exceeding a predetermined threshold value, with all of the paper media of the group is called "paper medium bundle." An example of the paper medium bundle is paper media 20 recognized as a bundle as shown in FIG. 6B. In the exemplary embodiment, at step 324, a paper ID conversion process is performed for the paper medium bundle. That is, for the paper medium group treated as a paper medium bundle, an electronic document is specified using a paper ID put on the paper medium on the top of the bundle without an electronic document being specified using the paper ID taken out at step 321. Specifically, the placement state management section 32 first references the placement state management table and determines as to whether or not a bundle ID corresponding to the paper ID is blank. If the bundle ID is blank, it means that the paper medium does not form a part of the paper medium bundle. If the bundle ID is not blank, the paper medium forms a part of the paper medium bundle and thus, the placement state management section 32 searches for a paper medium 20 having the maximum value of layers contained in the placement state corresponding to the same bundle ID and specifies an electronic document using a paper ID of the found paper medium 20.

Further, in the exemplary embodiment, a mode in which the determination result at step 322 is "change" contains (i) the case where the paper medium 20 is removed, (ii) the case where a new paper medium 20 is placed and (iii) the case where the placement state of an already placed paper medium 20 is changed. In the first case, information concerning the removed paper medium 20 may be deleted from the placement state management table at step 323, a document ID and page number corresponding to a paper ID of the removed paper medium 20 may be determined at step 324, the information concerning the document ID and the page number may be deleted from the display state management table at step 325, and a command for erasing an image corresponding to the document ID and the page number may be transmitted at step 327.

Next, the placement state registration process in FIGS. 12 and 13 will be described.

Figure 14:
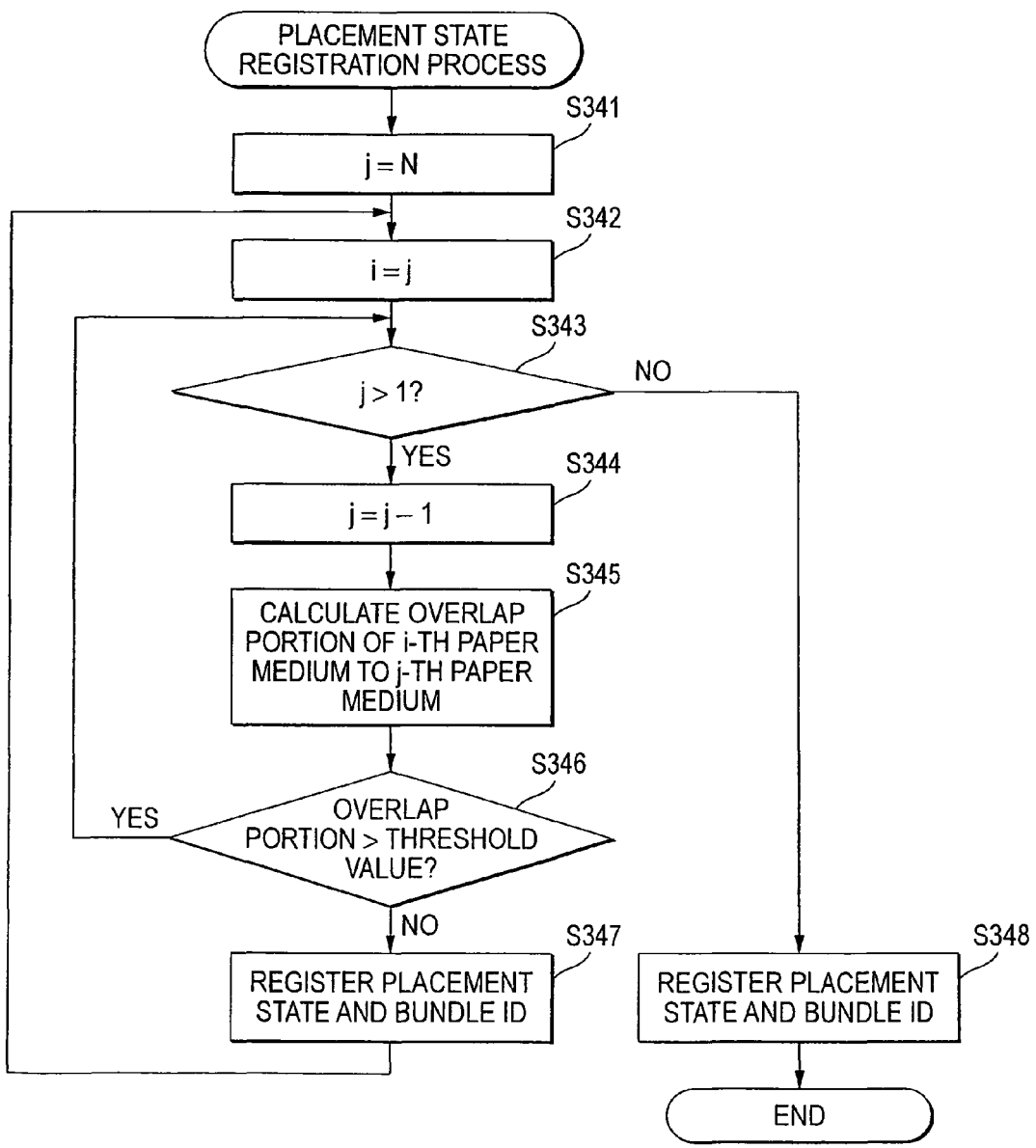
FIG. 14 is a flowchart to show an operation of a placement state registration process in the exemplary embodiment of the invention.

FIG. 14 is a flowchart to show a flow of the placement state registration process. The process is performed for paper media 20 or a paper medium bundle as described in the operation in FIGS. 12 and 13. In the following description, it is assumed that the maximum value of the layer values of the paper media 20 contained in the paper medium bundle is N.

In the process, the placement state management section 32 checks an overlap state of an i-th paper medium 20, from the top of the N paper media 20, to a j-th paper medium 20. To do this, first N is assigned to a variable j (step 341), and the value of the variable j is assigned to the variable (step 342). At this time, both of the values of i and j are equal to N. In this state, while the value of j is decremented by one at a time, the overlap state is checked (step 343). If j is larger than 1, one is subtracted from j (step 344) and an area of the overlap portion of the i-th paper medium 20 to the j-th paper medium 20 is calculated (step 345).

Whether or not the area of the overlap portion is larger than a threshold value is determined (step 346). As a result, if the area is larger than the threshold value, the process returns to step 343. Then, one is further subtracted from j unless j is equal to 0, and determination as to whether or not the area of the overlap portion of the i-th paper medium 20 to the j-th paper medium 20 is larger than the threshold value is repeated. It is assumed that when j becomes a certain value, the area of the overlap portion of the i-th paper medium 20 to the j-th paper medium 20 becomes equal to or smaller than the threshold value. In this case, the paper media of the i-th paper medium 20 to the (j+1)-th paper medium 20 are treated as a bundle and a placement state of the bundle is registered and the same bundle ID is also registered (step 347). For example, in FIG. 10A, paper media 20 having the paper IDs "P002," "P003," and "P004" become one bundle and the bundle ID "B001" is registered.

On the other hand, it is assumed that j reaches 1 in the process of decrementing j. In this case, the paper media of the i-th paper medium 20 to the bottom paper medium 20 are treated as one bundle, a placement state about the bundle is registered and the same bundle ID is also registered (step 348).

An updating unit (not shown) may update electronic documents which are sources of images recorded on the paper media 20 recognized as a bundle in a collective fashion. Here, a process of updating the paper media 20 collectively includes a process of combining plural electronic documents into one, for example. The updating unit may perform an update process of sorting pages of an electronic document in response to sort of paper media 20 as shown in FIG. 7B.

Last, to implement the exemplary embodiment as a computer 90, the hardware configuration of the computer 90 will be described.

Figure 15:
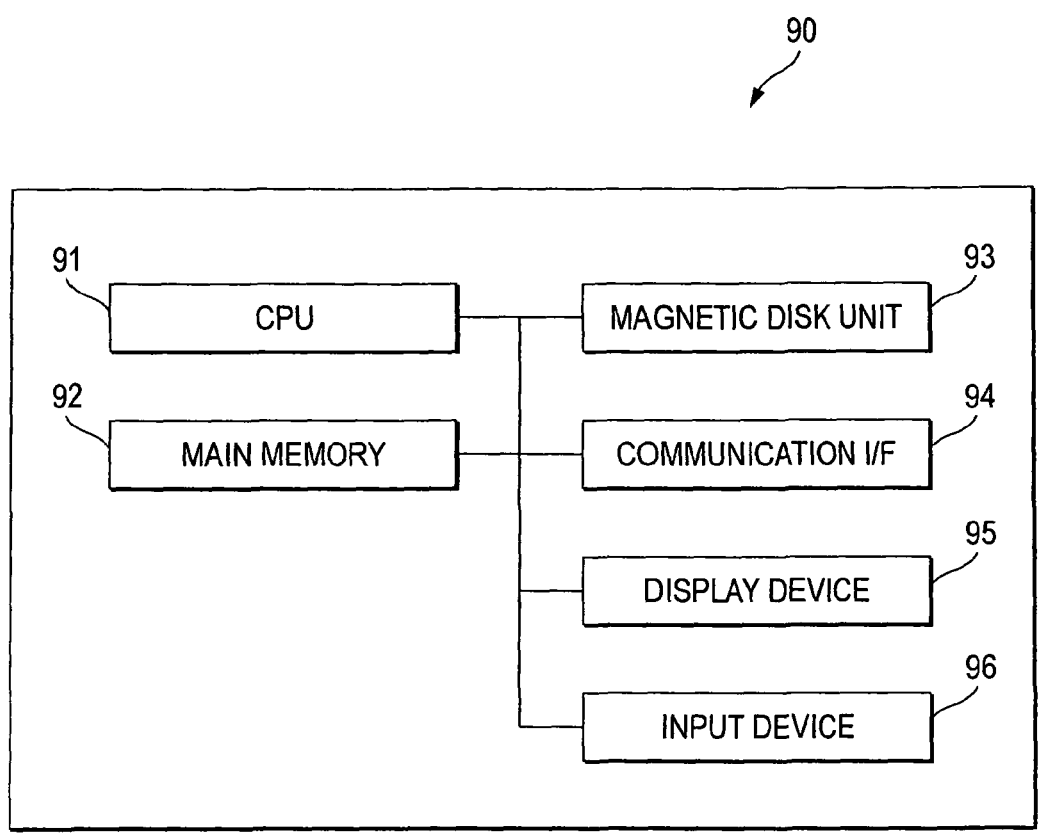
FIG. 15 is a diagram to show the hardware configuration of a computer that can implement the exemplary embodiment of the invention.

FIG. 15 is a diagram to show the hardware configuration of the computer 90.

As shown in the figure, the computer 90 includes a CPU (Central Processing Unit) 91 of computation means and main memory 92 and a magnetic disk unit (HDD: Hard Disk Drive) 93 of storage means. The CPU 91 executes various types of software of OS (Operating System), applications, etc., for implementing the functions described above. The main memory 92 is a storage area for storing various types of software, data used for execution of the software, and the like, and the magnetic disk unit 93 is a storage area for storing input data to various types of software, output data from various types of software, and the like.

Further, the computer 90 includes a communication I/F 94 for conducting external communications, a display device 95 made up of video memory, a display, etc., and input devices 96 of a keyboard, a mouse, etc.

The program for implementing the exemplary embodiment can be provided not only through communication means, but also as a computer-readable recording (storage) medium such as a CD-ROM storing the program.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

Last, to implement the exemplary embodiment as a computer 90, the hardware configuration of the computer 90 will be described.

FIG. 15 is a diagram to show the hardware configuration of the computer 90.

As shown in the figure, the computer 90 includes a CPU (Central Processing Unit) 91 of computation means and main memory 92 and a magnetic disk unit (HDD: Hard Disk Drive) 93 of storage means. The CPU 91 executes various types of software of OS (Operating System), applications, etc., for implementing the functions described above. The main memory 92 is a storage area for storing various types of software, data used for execution of the software, and the like, and the magnetic disk unit 93 is a storage area for storing input data to various types of software, output data from various types of software, and the like.

Further, the computer 90 includes a communication I/F 94 for conducting external communications, a display device 95 made up of video memory, a display, etc., and input devices 96 of a keyboard, a mouse, etc.

The program for implementing the exemplary embodiment can be provided not only through communication means, but also as a computer-readable recording (storage) medium such as a CD-ROM storing the program.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control device comprising:
   a state specifying unit that specifies a placement state of a non-electronic medium on a display screen;
   an information specifying unit that specifies either (i) electronic information which is a source of an image recorded on the non-electronic medium or (ii) electronic information relevant to the electronic information which is the source of the image recorded on the non-electronic medium; and
   a controller that controls such that a specific image representing the electronic information specified by the information specifying unit is displayed on the display screen in accordance with the placement state specified by the state specifying unit, wherein
   the placement state includes a coordinate of the non-electronic medium on the display screen, and
   when the placement state of the non-electronic medium on the display screen is changed, the controller changes the specific image displayed on the display screen based on the change of the placement state.

2. The display control device according to claim 1, wherein
   the electronic information specified by the information specifying unit contains a plurality of elements that have a predetermined sequence relation, and
   the controller controls such that the specific image is displayed in accordance with a preceding element and a following element, in the predetermined sequence relation, among the plurality of elements for the electronic information which is the source of the image recorded on the non-electronic medium.

3. The display control device according to claim 1, further comprising:
   a medium specifying unit, wherein
   if the placement state specified by the state specifying unit indicates that the non-electronic medium overlaps another non-electronic medium, the medium specifying unit specifies the non-electronic medium based on the other non-electronic medium.

4. The display control device according to claim 1, wherein when the non-electronic medium placed on the display screen is lifted up to a predetermined height or more from the display screen, the controller controls such that the specific image displayed on the display screen disappears.

5. The display control device according to claim 1, wherein when an image relevant to the specific image is displayed on the display screen, the controller displays the image relevant to the specific image around the specific image displayed on the display screen based on placement of the non-electronic medium on the display screen.

6. The display control device according to claim 1, wherein when the non-electronic medium placed on the display screen is lifted up to a predetermined height or more from the display screen, the controller stores the change of the specific image displayed on the display screen.

7. A media management device comprising:
   a state specifying unit that specifies an overlap state of a plurality of non-electronic media on a display screen;
   an information specifying unit that specifies plural pieces of electronic information which are sources of images recorded on the plurality of non-electronic media; and
   an updating unit that updates the plural pieces of electronic information specified by the information specifying unit in accordance with the overlap state specified by the state specifying unit, wherein
   the overlap state includes a coordinate of each of the plurality of non-electronic media on the display screen.

8. The media management device according to claim 7, wherein
   the state specifying unit specifies an area of an overlap portion among the plurality of non-electronic media as the overlap state of the plurality of non-electronic media, and
   if the area specified by the state specifying unit exceeds a predetermined threshold value, the updating unit updates the plural pieces of electronic information so that the plural pieces of electronic information are treated as one piece.

9. The media management device according to claim 7 wherein
   the state specifying unit specifies an overlap sequence of the plurality of non-electronic media as the overlap state of the plurality of non-electronic media, and
   the updating unit updates the plural pieces of electronic information so that the overlap sequence specified by the state specifying unit match a sequence of elements corresponding to the respective non-electronic media of the plural pieces of electronic information.

10. A non-transitory computer-readable medium storing a computer readable program for causing a computer to execute a media management process, the media management process comprising:
    specifying a placement state of a non-electronic medium on a display screen;
    specifying either (i) electronic information which is a source of an image recorded on the medium or (ii) electronic information relevant to the electronic information which is the source of the image recorded on the non-electronic medium; and
    controlling such that a specific image representing the specified electronic information is displayed on the display screen in accordance with the specified placement state, wherein
    the placement state includes a coordinate of the non-electronic medium on the display screen, and
    when the placement state of the non-electronic medium on the display screen is changed, changing the specific image displayed on the display screen based on the change of the placement state.

11. A non-transitory computer-readable medium storing a computer readable program for causing a computer to execute a media management process, the media management process comprising:

specifying an overlap state of a plurality of non-electronic media on a display screen;

specifying plural pieces of electronic information which are sources of images recorded on the plurality of non-electronic media; and updating the plural pieces of specified electronic information in accordance with the specified overlap state, wherein the overlap state includes a coordinate of each of the plurality of non-electronic media on the display screen.

12. A display control device comprising:

a state specifying unit that specifies a placement state of a non-electronic medium on a display screen;

an information specifying unit that specifies either (i) electronic information which is a source of an image recorded on the non-electronic medium or (ii) electronic information relevant to the electronic information which is the source of the image recorded on the non-electronic medium; and a controller that controls such that a specific image representing the electronic information specified by the information specifying unit is displayed on the display screen in accordance with the placement state specified by the state specifying unit, wherein the placement state includes a coordinate of the non-electronic medium on the display screen, the display screen is horizontal, and the display screen includes
- a top plate,
- a top plate supporting portion that supports the top plate,
- a projection unit that projects an image onto the top plate from a rear side of the display screen, and
- an infrared light source that illuminates a rear surface of the medium.

\* \* \* \* \*